Dec. 6, 1938.  D. O. LYBRAND  2,139,059

INSTRUMENT MOUNTING

Filed April 23, 1936

Inventor

Daniel O. Lybrand

By Samuel Scrivener Jr.

Attorney

Patented Dec. 6, 1938

2,139,059

UNITED STATES PATENT OFFICE 2,139,059

INSTRUMENT MOUNTING

Daniel O. Lybrand, Washington, D. C., assignor to Washington Institute of Technology, Inc., Washington, D. C., a corporation of Delaware Application April 23, 1936, Serial No. 76,081

1 Claim. (Cl. 248—27)

This invention relates to the mounting of instruments in the instrument panel or dashboard of an aircraft, motor vehicle or other mobile craft or stationary installation. More particularly, the invention provides means for so mounting one or more instruments in a panel or dashboard that shocks and vibrations incident to or resulting from the operation or movement of the craft or other installation, or from any other cause, will not be transmitted to the instruments, but such instruments will be completely and effectively isolated from such vibrations and shocks and will therefore be maintained in a steady state.

The invention is particularly adapted to the mounting of aircraft instruments on the instrument panel or other portion of an aircraft. This particular field of utility of the invention is due to the fact that aircraft members as is well known are subject to considerable vibrations set up therein by the propeller and other rotating portions of the aircraft propulsion mechanism and are also subjected to landing and other shocks. Both the vibration and shock effects are very deleterious to certain of the aircraft navigating instruments, particularly those employed in blind or instrument navigating or blind landing, and one of the more specific features of the invention proposes to mount one or more of these instruments as a unit in such a manner that the entire unitary assembly will be isolated from the objectionable vibrations and shocks.

It is accordingly an object of the invention to provide a means for mounting one or more instruments in an instrument panel or dashboard in such a manner that the instruments so mounted will be isolated from any shocks or vibrations which may be transmitted to or set up in the dashboard or panel. This object may be achieved in any mobile or stationary installation where it is desirable or necessary to isolate one or more instruments from such shocks or vibrations.

Another object of the invention is to provide an instrument assembly which may be interchangeably mounted in any instrument panel or board, regardless of the general shape or outline of the instrument panel or board, whereby a selected instrument or set of instruments may be so mounted in a unitary assembly that the instruments in the unitary assembly may be easily and quickly transferred from one instrument panel or board to another.

Another object is to provide a novel means for shock mounting one or more instruments in a panel or dashboard, which means will permit the easy removal of the instrument or instruments.

Other objects and features of novelty will be apparent from the following description and the annexed drawing, it being specifically stated that such description and drawing are only illustrative of the invention, the limits of which are defined by the appended claim.

Referring to the drawing, in which similar reference numerals refer to like parts, Fig. 1 is a plan view of an instrument panel showing a plurality of instruments mounted therein by means according to the present invention;

Figure 1:
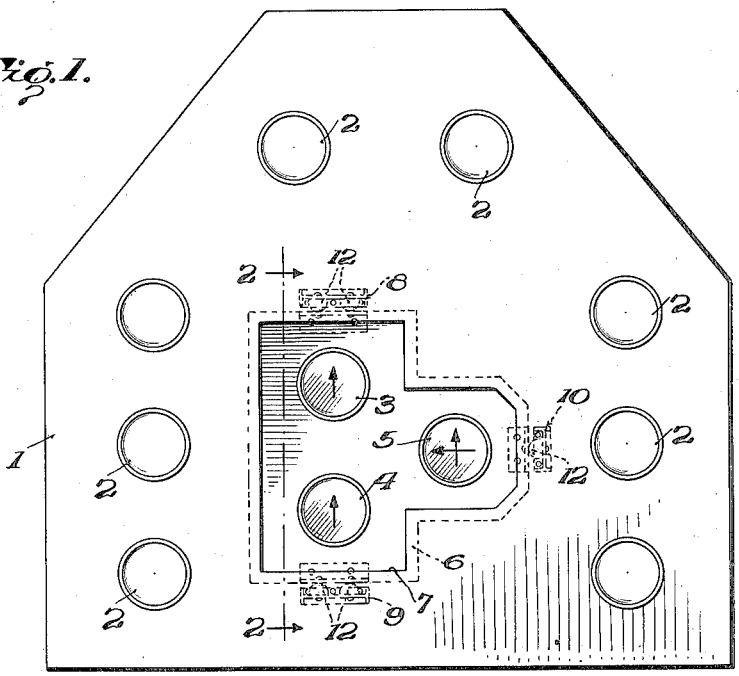

Referring particularly to Fig. 1 of the drawing there is disclosed an instrument panel or dashboard 1 which may be mounted, in a well known manner, in an aircraft or motor vehicle or which may be the control panel or instrument board of a stationary installation of any type. For purposes of illustration the panel 1 has been shown as having the usual shape of the instrument board of an aircraft, although it will be clearly understood that the shape, size or location of the panel has no bearing whatsoever on the invention.

Mounted in the panel 1 are a plurality of instruments 2 these being attached to and supported by the panel 1 in any desired manner which forms no part of the inventon. It will be understood that the instruments 2 are of such type or construction that they do not require shock mounting and may therefore be rigidly attached to the instrument panel 1.

Certain instruments have been found to be deleteriously affected by vibrations or shocks, and it has been found that the operation or accuracy of certain types of instruments are adversely affected by such causes to such an extent as to seriously impair or completely prevent the operation of the instrument. In this respect and with particular regard to aircraft navigating instruments, it has been found that such instruments as the artificial horizon, the directional gyroscope and the electrical cross-pointer instrument of the milliammeter type employed for blind landing purposes are all subject to very serious effects resulting from vibrations and shocks.

Means are provided by this invention for so mounting one or more of such instruments in a panel or dashboard as to effectively isolate them from any vibrations or shocks which are transmitted to or set up in the panel or dashboard. In Fig. 1 of the drawing there is disclosed a form of the invention in which three instruments are shock mounted in the instrument panel 1, these three instruments being the artificial horizon 3, the directional gyroscope 4 and the cross-pointer instrument 5. These three instruments are rigidly mounted in a plate or panel 6 in any suitable manner such that the indicating faces of the instruments will all lie substantially in one plane adjacent one face of the plate 6. The plate 6 may be of any shape which is found to be suitable to receive and mount the instruments. In the form shown in Fig. 1 the plate 6 is generally T-shaped in outline, the head of the T being vertically disposed and receiving two of the instruments in vertical alignment, while the third instrument is disposed in the leg of the T. It will be apparent that any shape, configuration, arrangement or disposition of the plate 6 and the instruments attached thereto may be employed without departing in any way from the scope of the invention.

The plate 6 and instruments 3, 4 and 5 form, when assembled, a unitary assembly separate from the panel 1 and in which the instruments are rigidly attached to the plate. In order to bring the instruments 3, 4 and 5 into the instrument panel assembly, an opening 7 is formed in the panel 1, which opening is preferably slightly smaller in all dimensions than the plate 6 but is preferably of substantially the same shape. The plate 6 is preferably disposed to the rear of and slightly spaced from the panel 1 and in such a position that it covers the opening 7 and overlaps the edges thereof at all places. In this position the faces of the instruments 3, 4 and 5 may be viewed through the opening 7 as clearly illustrated in Fig. 1. If desired, the plate 6 may be disposed within the opening 7 or in front of the panel 1, although these are not preferred constructions.

Means are provided by the invention for mounting the assembled plate 6 and instruments 3, 4 and 5 in the position and manner described hereinbefore and such means comprise resilient supports preferably carried by the panel 1 and supporting the plate 6 in such a manner that the plate 6 will have a limited amount of cushioned movement in all directions. In the form of the invention illustrated in Fig. 1 three shock supports are provided for the plate 6. Two of these supports, 8 and 9, are mounted on the rear face of the panel 1 at points adjacent the upper and lower edges of the opening 7, while the third support 10 is disposed adjacent the outermost extremity of the lateral extension of the opening 7 and is also attached to the rear face of the panel 1. When so mounted and arranged with respect to the opening 7, the supports 8, 9 and 10 lie adjacent the upper, lower and lateral edges of the plate 6, which edges are disposed to the rear of the panel 1 and are preferably covered thereby. The plate 6 may accordingly be connected to the resilient supports 8, 9 and 10 whereby the plate 6 will preferably completely overlap the opening 7 and will permit the faces of the instruments 3, 4 and 5 to be viewed through the opening 7 all in the manner described hereinbefore. In addition, the mounting of the plate 6 on the resilient supports 8, 9 and 10 provides a floating support for the plate 6 which insures that no vibrations or shocks which may be transmitted to or be set up in the panel 1 or other parts will be transmitted to either the plate 6 or the instruments carried thereby.

It will be apparent that additional resilient supports may be provided between the panel 1 and plate 6, but it is preferred to employ as few supports as possible in order to decrease as much as possible the rigidity and stiffness of the connection between the panel and the instrument-carrying plate. In this connection it has been found that the total strength of the resilient supports should be slightly greater than the total weight of the shock-mounted instrument and panel assembly.

If desired, instead of providing a single opening 7 in the panel 1 through which the instruments 3, 4 and 5 may be viewed, a plurality of separated openings may be provided, each of such openings registering with the face of one of the instruments when the plate 6 and instruments 3, 4 and 5 are positioned as illustrated in Fig. 1.

Figure 2:
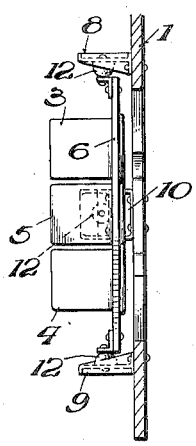
Fig. 2 is a sectional view on the line 2—2 of Fig. 1.
Figure 3:
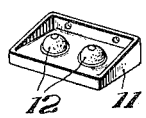
Fig. 3 is a detail view showing one type of shock support which may be employed in carrying out the invention.

While the specific form of the resilient shock supports used to attach the plate 6 to panel 1 is not of primary importance in this invention, it has been found that supports of the type illustrated in Figs. 2 and 3 provide satisfactory results. These supports comprise a base member 11 which is adapted to be attached to the rear face of panel 1 and which carries one or more resilient supporting members 12 to which the edge of plate 6 is attached, either directly or by means of bracket members, as disclosed. The resilient members 12 may be formed of spring, rubber or other suitable resilient material. The specific form of the shock mounting device per se obviously forms no part of the present invention.

Figure 4:
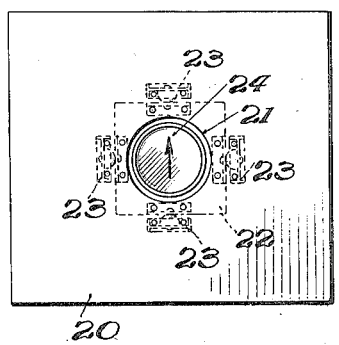
Fig. 4 is a plan view of a portion of an instrument panel showing a single instrument mounted therein by means according to the invention.

While there has been described heretofore a form of the invention in which a plurality of instruments are mounted as a unit on a panel, the invention contemplates that one or more instruments may be shock-mounted on a panel, and in Fig. 4 there is disclosed an assembly in which a single instrument is shock mounted on a panel. Referring to that figure there is disclosed a panel member 20 having an opening 21 of any desired shape formed therein. Disposed preferably to the rear of the panel 20 and in such a position as to cover the opening 21 is a plate 22, this plate being supported in position covering the opening 21 by resilient means 23 which may, if desired, be of the form disclosed in Fig. 3. An instrument 24 is rigidly attached to the plate 22 and is therefore resiliently supported with respect to the panel 20 whereby the instrument will be isolated from any vibrations or shocks transmitted to or set up in the panel 20. In the embodiment illustrated in Fig. 4, I have shown four shock supports 23 attaching the plate 22 to panel 20 but any less or greater number of shock supports may be provided. In general, it has been found that the best results are obtained by decreasing the number of shock supports in order to reduce the rigidity of the connection between the panel and the instrument-carrying plate, this being limited by the observations in this regard set forth hereinbefore.

Figure 5:
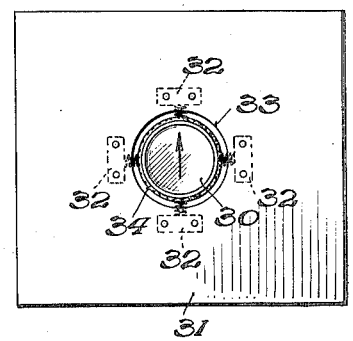
Fig. 5 is a plan view of a portion of an instrument panel showing an instrument directly and resiliently mounted thereon.

In the forms of the invention heretofore described, the shock-mounted instrument or instruments have been carried by a plate which has been resiliently carried by the instrument panel. While this is the preferred method of carrying out the invention, it may be possible that, in certain circumstances, it would be desirable to dispense with the instrument-carrying plate and resiliently connect the instrument or instruments directly to the instrument panel. Such a construction is illustrated in Fig. 5 of the drawing wherein is disclosed the instrument 30 which is resiliently and directly connected to the instrument panel 31 by shock supports 32, the instrument face being visible through an opening 33 in the panel 31. As disclosed in Fig. 5, the shock supports are connected to the instrument by a ring 34 which surrounds and may be clamped to the instrument, although this ring may be omitted, if desired or necessary.

While I have illustrated and described certain forms of my invention it will be apparent to those skilled in the art that modifications and improvements may be made therein without in any way departing from the spirit or scope of the invention, for the limits of which reference must be had to the appended claim.

I claim:

In combination, an instrument panel having an opening therein, a plate disposed to the rear of and spaced from said panel and being of such a size and shape as to substantially cover the opening therein, said plate being constructed and adapted to have mounted thereon a plurality of instrument devices having face portions, whereby when said instrument devices are attached to said plate all of the face portions of said instrument devices may be viewed through the opening in said panel, and means for resiliently attaching said plate to said panel.

DANIEL O. LYBRAND.